United States Patent
Hall et al.

(10) Patent No.: US 8,198,898 B2
(45) Date of Patent: Jun. 12, 2012

(54) DOWNHOLE REMOVABLE CAGE WITH CIRCUMFERENTIALLY DISPOSED INSTRUMENTS

(75) Inventors: David R. Hall, Provo, UT (US); Paula Turner, Pleasant Grove, UT (US); Katie George, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 385 days.

(21) Appl. No.: 12/405,880

(22) Filed: Mar. 17, 2009

(65) Prior Publication Data

US 2009/0188663 A1 Jul. 30, 2009

Related U.S. Application Data

(63) Continuation-in-part of application No. 12/341,771, filed on Dec. 22, 2008, now Pat. No. 7,898,259, which is a continuation-in-part of application No. 11/776,447, filed on Jul. 11, 2007, now Pat. No. 7,598,742, application No. 12/405,880, which is a continuation-in-part of application No. 11/687,891, filed on Mar. 19, 2007, now Pat. No. 7,301,429, which is a continuation-in-part of application No. 11/676,494, filed on Feb. 19, 2007, now Pat. No. 7,265,649.

(60) Provisional application No. 60/914,619, filed on Apr. 27, 2007.

(51) Int. Cl.
*G01V 3/00* (2006.01)
(52) U.S. Cl. ........................................ 324/338; 324/339

(58) Field of Classification Search .................... 324/90, 324/338–341, 345, 346, 349, 356, 369, 333; 336/65, 90–92, 192, 198; 166/65.1, 66, 242.5, 166/373, 380
See application file for complete search history.

(56) References Cited

U.S. PATENT DOCUMENTS

| | | | |
|---|---|---|---|
| 4,278,556 A | 7/1981 | Tada | |
| 4,302,722 A | 11/1981 | Gianzero | |
| 4,536,714 A | 8/1985 | Clark | |
| 4,648,627 A * | 3/1987 | Reimert | 285/24 |
| 4,766,384 A | 8/1988 | Kleinberg et al. | |
| 4,785,247 A | 11/1988 | Meador | |
| 4,808,929 A | 2/1989 | Oldigs | |
| 4,839,644 A | 6/1989 | Safinya et al. | |
| 4,881,988 A | 11/1989 | Bonser | |
| 4,933,640 A | 6/1990 | Kuckes | |
| 4,980,643 A | 12/1990 | Gianzero | |
| 5,045,795 A | 9/1991 | Gianzero | |
| 5,081,419 A | 1/1992 | Meador | |
| 5,089,779 A | 2/1992 | Rorden | |
| 5,095,272 A | 3/1992 | Sinclair | |
| 5,138,263 A | 8/1992 | Towle | |
| 5,428,293 A | 6/1995 | Sinclair | |
| 5,442,294 A | 8/1995 | Rorden | |
| 5,448,227 A | 9/1995 | Orban | |
| 5,491,488 A | 2/1996 | Wu | |
| 5,530,358 A | 6/1996 | Wisler | |
| 5,594,343 A | 1/1997 | Clark | |

(Continued)

*Primary Examiner* — Reena Aurora
(74) *Attorney, Agent, or Firm* — Brinks Hofer Gilson & Lione

(57) ABSTRACT

A downhole drill string component is disclosed comprising a substantially cylindrical cage with a hollow bore. An inner diameter of the cage is slideably connectable to a mandrel. A stab connection originates from one end of the cage and a plurality of downhole drill string instruments is circumferentially disposed around an outer diameter of the cage.

20 Claims, 10 Drawing Sheets

U.S. PATENT DOCUMENTS

| | | | |
|---|---|---|---|
| 5,606,260 A | 2/1997 | Giordano | |
| 5,668,475 A | 9/1997 | Orban et al. | |
| 5,833,019 A * | 11/1998 | Gynz-Rekowski | 175/325.6 |
| 5,905,379 A | 5/1999 | Orban et al. | |
| 6,068,394 A | 5/2000 | Dublin | |
| 6,082,484 A | 7/2000 | Molz et al. | |
| 6,100,696 A | 8/2000 | Sinclair | |
| 6,114,972 A | 9/2000 | Smith | |
| 6,163,155 A | 12/2000 | Bittar | |
| 6,191,586 B1 | 2/2001 | Bittar | |
| 6,218,842 B1 | 4/2001 | Bittar | |
| 6,259,030 B1 | 7/2001 | Tanigawa et al. | |
| 6,285,014 B1 | 9/2001 | Beck et al. | |
| 6,297,639 B1 | 10/2001 | Clark et al. | |
| 6,344,746 B1 | 2/2002 | Chunduru et al. | |
| 6,359,438 B1 | 3/2002 | Bittar | |
| 6,476,609 B1 | 11/2002 | Bittar | |
| 6,538,447 B2 | 3/2003 | Bittar | |
| 6,577,129 B1 | 6/2003 | Thompson | |
| 6,586,939 B1 | 7/2003 | Fanini | |
| 6,614,360 B1 * | 9/2003 | Leggett et al. | 340/853.1 |
| 6,630,831 B2 | 10/2003 | Amini | |
| 6,641,434 B2 | 11/2003 | Boyle et al. | |
| 6,646,441 B2 | 11/2003 | Thompson et al. | |
| 6,667,620 B2 | 12/2003 | Homan | |
| 6,670,880 B1 | 12/2003 | Hall et al. | |
| 6,677,756 B2 | 1/2004 | Fanini | |
| 6,680,613 B2 | 1/2004 | Rosthal | |
| 6,688,396 B2 | 2/2004 | Floerke et al. | |
| 6,690,170 B2 | 2/2004 | Homan et al. | |
| 6,703,837 B1 | 3/2004 | Wisler et al. | |
| 6,765,385 B2 | 7/2004 | Sinclair et al. | |
| 6,768,407 B2 | 7/2004 | Kohda et al. | |
| 6,768,700 B2 | 7/2004 | Veneruso et al. | |
| 6,777,940 B2 | 8/2004 | Macune | |
| 6,810,331 B2 | 10/2004 | Bittar et al. | |
| 6,814,162 B2 | 11/2004 | Moran et al. | |
| 6,849,195 B2 | 2/2005 | Basheer et al. | |
| 6,900,640 B2 | 5/2005 | Fanini et al. | |
| 6,913,095 B2 | 7/2005 | Krueger | |
| 6,915,701 B1 | 7/2005 | Tarler | |
| 6,975,243 B2 | 12/2005 | Clark et al. | |
| 7,026,820 B2 | 4/2006 | Xiao et al. | |
| 7,031,839 B2 | 4/2006 | Tabarovsky et al. | |
| 7,032,707 B2 | 4/2006 | Egerev et al. | |
| 7,038,457 B2 | 5/2006 | Chen et al. | |
| 7,040,003 B2 | 5/2006 | Hall et al. | |
| 7,046,009 B2 | 5/2006 | Itskovich | |
| 7,057,392 B2 | 6/2006 | Wang et al. | |
| 7,064,676 B2 | 6/2006 | Hall et al. | |
| 7,091,810 B2 | 8/2006 | Hall et al. | |
| 7,095,232 B2 | 8/2006 | Haber et al. | |
| 7,098,657 B2 | 8/2006 | Guilhamat | |
| 7,098,858 B2 | 8/2006 | Bittar | |
| 7,116,199 B2 | 10/2006 | Hall et al. | |
| 7,138,803 B2 | 11/2006 | Bittar | |
| 7,138,897 B2 | 11/2006 | Minerbo | |
| 7,141,981 B2 | 11/2006 | Folberth | |
| 7,150,316 B2 | 12/2006 | Itskovich | |
| 7,193,420 B2 | 3/2007 | Chen | |
| 7,212,132 B2 | 5/2007 | Gao | |
| 7,265,649 B1 | 9/2007 | Hall et al. | |
| 7,284,605 B2 * | 10/2007 | Clark et al. | 166/254.2 |
| 7,301,429 B1 | 11/2007 | Hall et al. | |
| 7,334,661 B2 | 2/2008 | Pabon et al. | |
| 7,360,610 B2 | 4/2008 | Hall et al. | |
| 7,477,114 B2 | 1/2009 | Pivit et al. | |
| 7,598,742 B2 | 10/2009 | Synder et al. | |
| 7,730,972 B2 | 6/2010 | Hall et al. | |
| 7,884,611 B1 | 2/2011 | Hall et al. | |
| 7,898,259 B2 | 3/2011 | Hall et al. | |
| 8,030,936 B2 | 10/2011 | Hall et al. | |
| 2004/0104794 A1 | 6/2004 | Kohda et al. | |
| 2004/0113626 A1 | 6/2004 | Wang et al. | |
| 2005/0152219 A1 * | 7/2005 | Garcia-Osuna et al. | 367/25 |
| 2006/0033502 A1 | 2/2006 | Bittar | |
| 2006/0158296 A1 | 7/2006 | Hall et al. | |
| 2006/0192561 A1 * | 8/2006 | Chesser et al. | 324/339 |
| 2006/0197629 A1 | 9/2006 | Pivit et al. | |
| 2006/0208383 A1 | 9/2006 | Aisenbrey | |
| 2008/0224707 A1 | 9/2008 | Wisler et al. | |
| 2008/0265894 A1 * | 10/2008 | Snyder et al. | 324/343 |
| 2009/0050372 A1 | 2/2009 | Hall et al. | |
| 2010/0052689 A1 | 3/2010 | Hall et al. | |

* cited by examiner

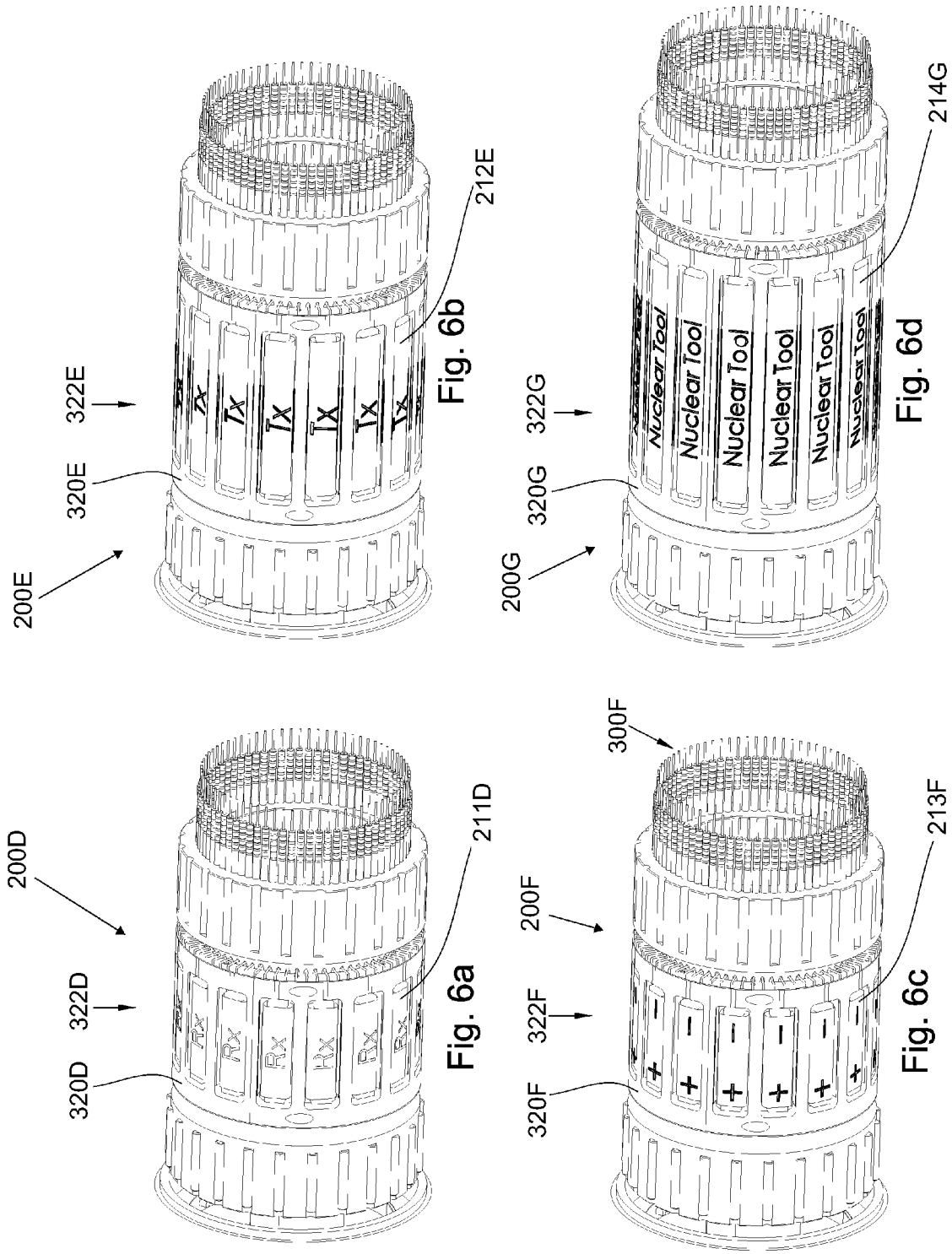

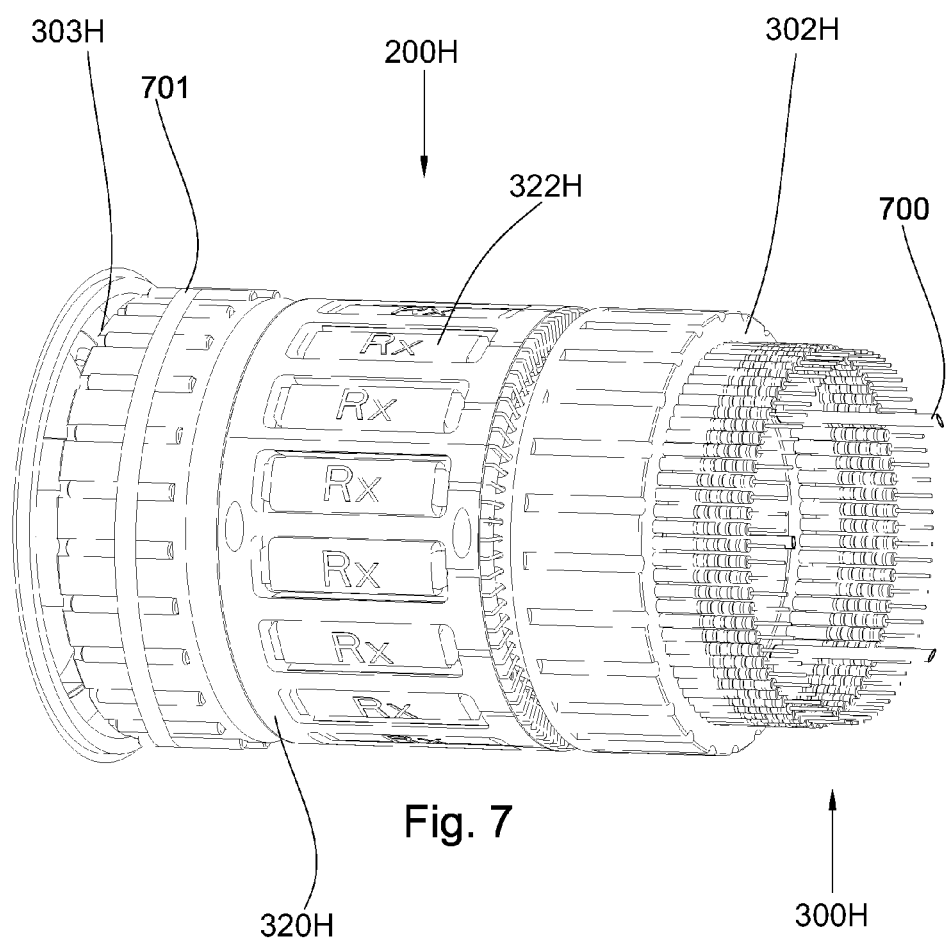

DOWNHOLE REMOVABLE CAGE WITH CIRCUMFERENTIALLY DISPOSED INSTRUMENTS

CROSS REFERENCE TO RELATED APPLICATIONS

This application is a continuation-in-part of U.S. patent application Ser. No. 12/341,771 filed on Dec. 22, 2008 entitled 'Downhole Induction Resistivity Tool' and which is now U.S. Pat. No. 7,898,259 issued on Mar. 1, 2011; which is a continuation-in-part of U.S. patent application Ser. No. 11/776,447 filed on Jul. 11, 2007 entitled 'Externally Guided and Directed Field Resistivity Tool' and which is now U.S. Pat. No. 7,598,742 issued on Oct. 6, 2009; which claims priority to Provisional U.S. Patent Application No. 60/914,619 filed on Apr. 27, 2007 and entitled 'Resistivity Tool.' This application is also a continuation-in-part of U.S. patent application Ser. No. 11/687,891 filed on Mar. 19, 2007 entitled 'Multiple Frequency Inductive Resistivity Device' and which is now U.S. Pat. No. 7,301,429 issued on Nov. 27, 2007. U.S. patent application Ser. No. 11/687,891 is a continuation-in-part of U.S. patent application Ser. No. 11/676,494 filed on Feb. 19, 2007 entitled 'Flexible Inductive Resistivity Device' and which is now U.S. Pat. No. 7,265,649; issued on Sep. 4, 2007. All of the above mentioned references are herein incorporated by reference for all that they contain.

BACKGROUND

The present invention relates to downhole drilling, such as downhole drilling technology for oil, gas, geothermal and horizontal drilling. More specifically, the present invention relates to downhole drill string components and connections between components. Also, the present invention relates to communication between uphole and downhole components.

Downhole instruments may be used to analyze downhole formation characteristics such as porosity or density, or to locate resource deposits in a formation. The assembly of a drill string having a plurality of instruments often involves electrically connecting the instruments individually. In many cases, each instrument must be wired separately. Downhole drill strings with multiple instruments can have a multiplicity of wires, often increasing the complexity of wiring downhole instruments to the desired location within the drill string. The overall efficiency of this method of wiring may be inferior to an apparatus that reduces the number of wires involved. Additionally, an apparatus with the ability to simultaneously electrically connect the plurality of instruments to a power source, processor, or a downhole network may reduce the assembly time of the drill string.

A common practice in the art involves exciting one instrument that is circumferentially wrapped around the drill string and used to gather borehole data downhole. Exciting this single instrument generally does not allow for only a portion of a borehole to be analyzed to determine downhole characteristics.

U.S. patent application Ser. No. 11/776,447 to Snyder, which is herein incorporated by reference for all that it contains, discloses an induction resistivity tool incorporated into a downhole tool string. The induction resistivity tool comprises an outer wall of a downhole component having an outer surface and at least one induction transmitter assembly disposed along the outer surface. The at least one transmitter assembly has at least one induction transmitter coil wound about at least one core. The at least one induction transmitter coil is adapted to project an induction signal outward from the outer wall when the at least one induction transmitter coil is carrying an electrical current. The transmitter assembly is adapted to create electromagnetic fields that originate the induction signal from outside the outer wall and substantially prevent the signal from entering the outer wall.

U.S. Pat. No. 5,045,795 to Gianzero, et al., which is herein incorporated by reference for all it contains, discloses a coil array that is installed on a MWD drill collar for use in a resistivity logging system. The drill collar is provided with upper and lower coil support rings. The coil support rigns are toroids which support individual coil segments, and are connected by suitable magnetic shorting bars. The coil segments and shorting bars inscribe a specified solid angle or azimuthal extent. By connecting the outputs of the several coils through a combining circuit, the coils on a single support ring can be connected in series additive, or subtractive relationship. Through the use of two such coil support rings with aligned coils on each, an azimuthally oriented window is thereby defined. By proper switching multiple azimuthally oriented windows can be made operative so that there is an azimuthal orientation to the current flow pattern relative to the MWD resistivity logging tool.

BRIEF SUMMARY

In one aspect of the invention a downhole drill string component comprises a substantially cylindrical cage. The cage has a hollow bore, with an inner diameter and an outer diameter. The inner diameter of the cage is slideably connectable to a mandrel. A stab connection originates from one end of the cage. A plurality of downhole drill string instruments is circumferentially disposed around the outer diameter of the cage.

In several different embodiments of the present invention the plurality of downhole drill string instruments may be induction receivers, induction transmitters, Halbach arrays, batteries, nuclear tools, acoustic tools, similar downhole instruments known in the art, or any combination of such instruments. The cage may have a stab connection dock adapted to receive a stab connection on the opposite end from the stab connection, thus allowing for several embodiments of the present invention to be interconnected, directly or with other elements in between.

The cage may comprise a shell disposed circumferentially about, and at least partially along an inner cylinder that sits intermediate, or between the downhole drill string instruments and the inner cylinder. The shell may have a plurality of recesses adapted to receive downhole drill string instruments. The shell may be segmented and the segments may be joined through a joining mechanism. The joining mechanism may comprise bolts, nuts, latches, screws, clips, hinges, adhesives, metallic bonding agents, welds, pins, other joining elements known in the art, or combinations thereof. The cage may have a seal on either end that may act to restrict access of a drilling fluid into certain areas.

The cage may have an alignment key proximate the stab connection to protect the stab connection while it is being connected to a stab connection dock. The cage may also have a plurality of grooves disposed circumferentially around the cage that match with a plurality of rods on a stab connection dock or other downhole component. These grooves and rods may provide torsional strength and further protect the stab connection.

The stab connection may electrically communicate with a multiplexor, may be uniquely addressable, and may include a processing unit.

BRIEF DESCRIPTION OF THE DRAWINGS

FIG. 6a is a perspective diagram of another embodiment of a cage.

FIG. 6b is a perspective diagram of another embodiment of a cage.

FIG. 6c is a perspective diagram of another embodiment of a cage.

FIG. 6d is a perspective diagram of another embodiment of a cage.

FIG. 7 is a perspective diagram of another embodiment of a cage.

DETAILED DESCRIPTION

Figure 1:
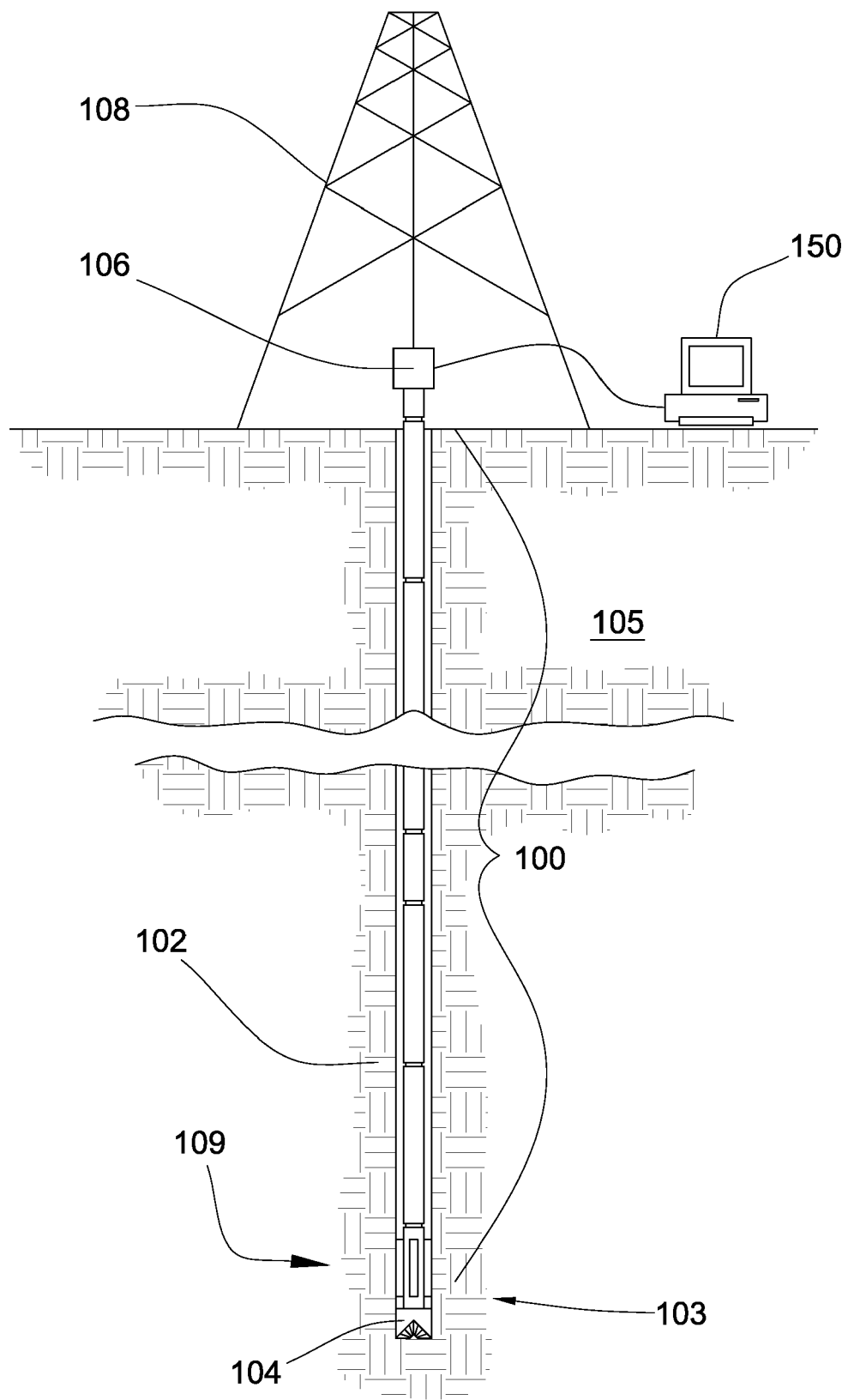
FIG. 1 is a side-view diagram of an embodiment of a tool string suspended in a borehole.

FIG. 1 is a side-view diagram depicting an embodiment of a drill string 100 suspended by a derrick 108 in a bore hole 102. A drilling assembly 103 is located at the bottom of the bore hole 102 and includes a drill bit 104. As the drill bit 104 rotates downhole the drill string 100 advances farther into the earth. The drill string 100 may penetrate soft or hard subterranean formations 105. Data gathered downhole may be sent to a surface data swivel 106 via a transmission system such as the one disclosed in U.S. Pat. No. 6,670,880 to Hall, which is herein incorporated by reference for all that it discloses. The data swivel 106 may send the data to surface equipment 150. Further, the surface equipment 150 may send data and/or power to downhole tools, the drill bit 104 and/or the drilling assembly 103. The drill string 100 may include a bottom hole assembly 109. The bottom hole assembly 109 may include a cage 200 (See FIG. 2). The cage 200 may be disposed above the bottom hole assembly 109.

Figure 2:
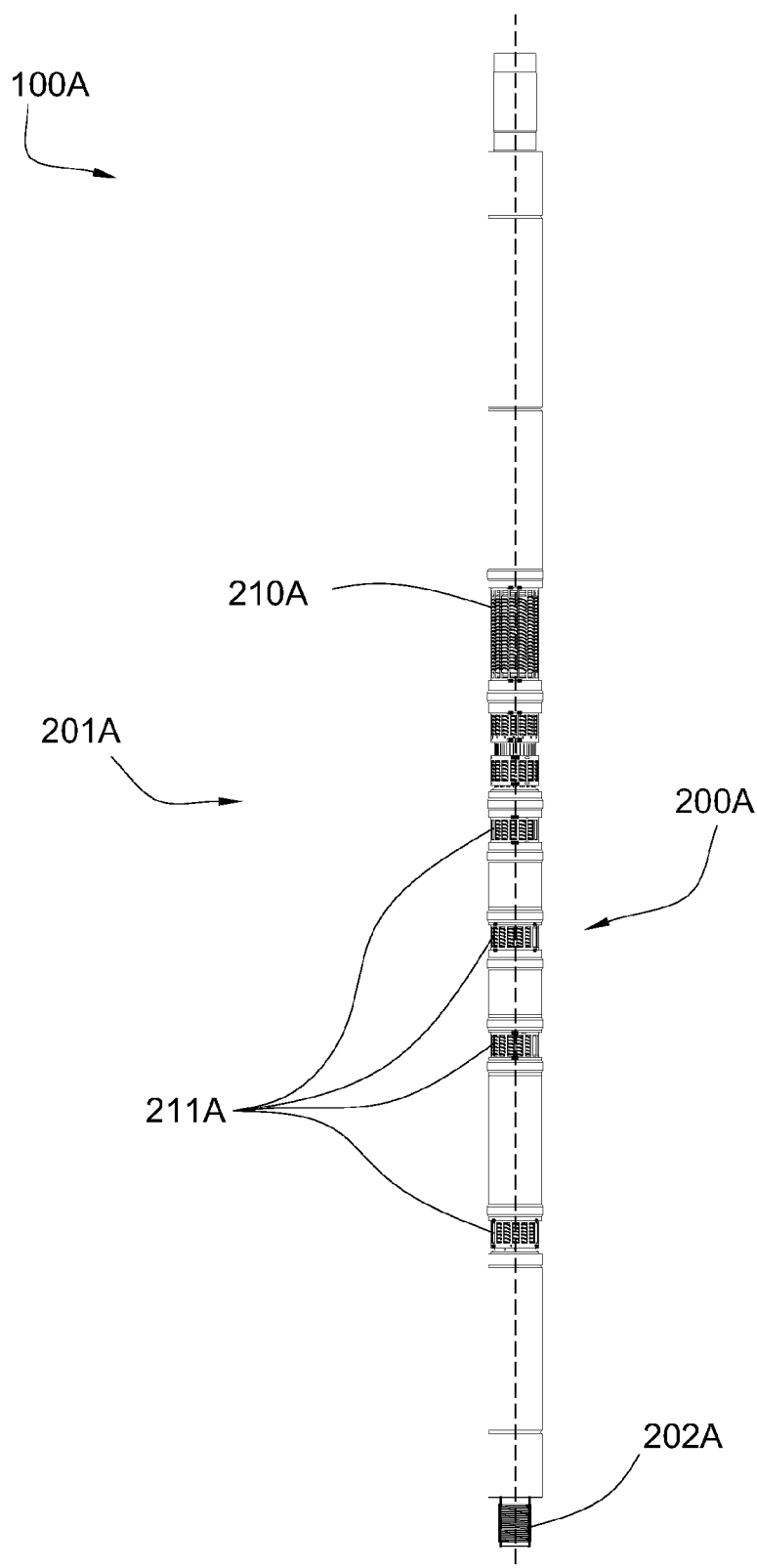
FIG. 2 is a side-view diagram of an embodiment of a tool string component.

FIG. 2 depicts an embodiment of a downhole tool string component 201A. The tool string component 201A includes a cage 200A. The cage 200A may be slid over a mandrel 202A of a drill string 100A and may be disposed adjacent other cages of varying purpose and function. The arrangement of the variety of cages may be changed by sliding the cages onto the mandrel 202A in a different order. The cage 200A may be adapted to function as an induction receiver, induction transmitter, acoustic tool, power source, nuclear tool, or combination thereof.

In one aspect of the invention, the tool string component 201A may include an induction transmitter 210A and a plurality of induction receivers 211A. The receivers 211A may be placed in a variety of orientations with respect to each other and to the transmitter 210A. The induction transmitter 210A is adapted to send an induction signal into the formation, which generates a formation induction field surrounding the well bore. The induction receivers 211A are adapted to sense various attributes of the induction field in the formation. These attributes may include among others, some or all of the following: frequency, amplitude, or phase. The induction transmitter 210A and the induction receivers 211A may be powered by batteries, a turbine generator or from the downhole network. The induction receivers 211A may also be passive. In some embodiments, there may be several induction transmitters located along the length of the tool string component 201A. The induction transmitter 210 and induction receivers 211 may communicate with the network through a multiplexor 626 (See FIG. 3a).

Figure 3A:
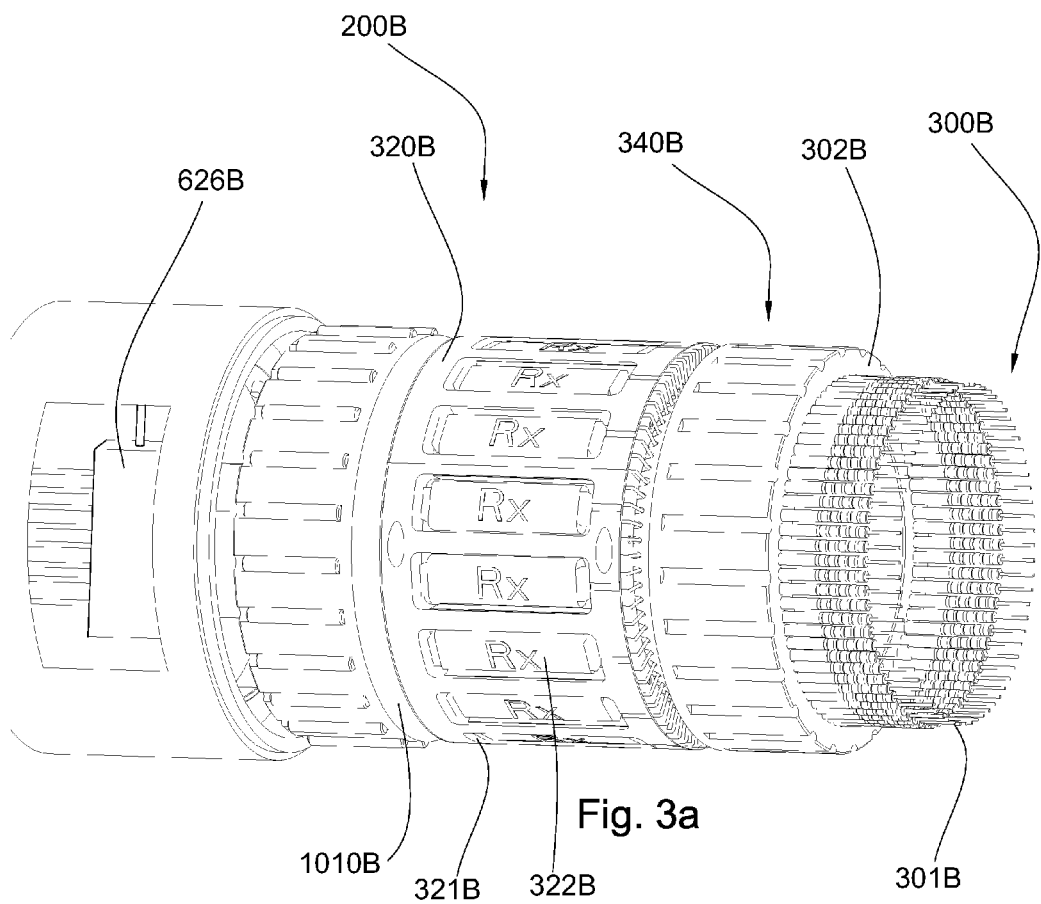
FIG. 3a is a perspective diagram of an embodiment of a cage.

FIG. 3a is a perspective diagram of an embodiment of a cage 200B. The cage 200B may include a stab connection 300B adapted to electrically connect the cage 200B with another downhole drill string component. The cage 200B with the stab connection 300B on a downhole drill string component 201B may expedite the assembly process of the drill string. The stab connection 300B allows the drill string to be assembled by placing multiple cages 200B onto a mandrel in any order. In the event of damage to a downhole drill string instrument 322B, the cage 200B may be removed from the drill string for inspection and/or replacement by sliding it along the mandrel.

Figure 5:
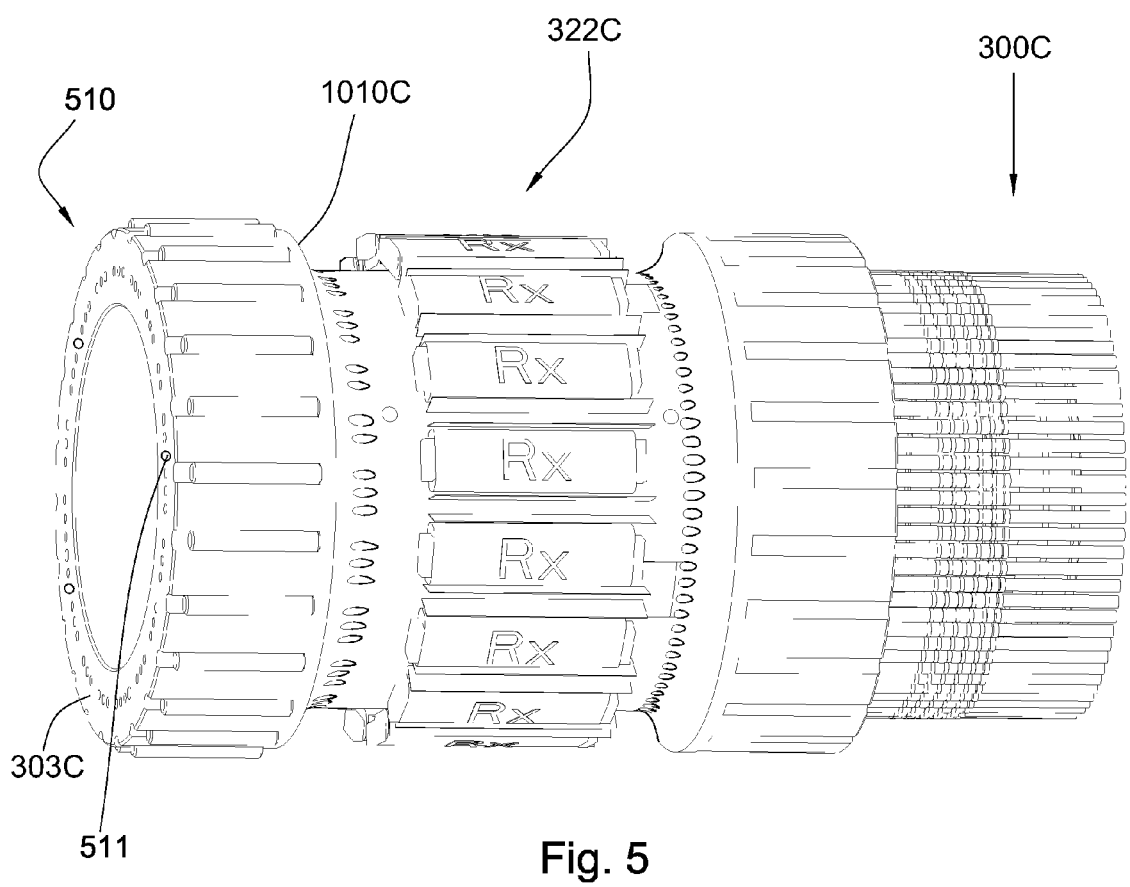
FIG. 5 is a perspective diagram of another embodiment of a cage.
Figures 8A, 8B:
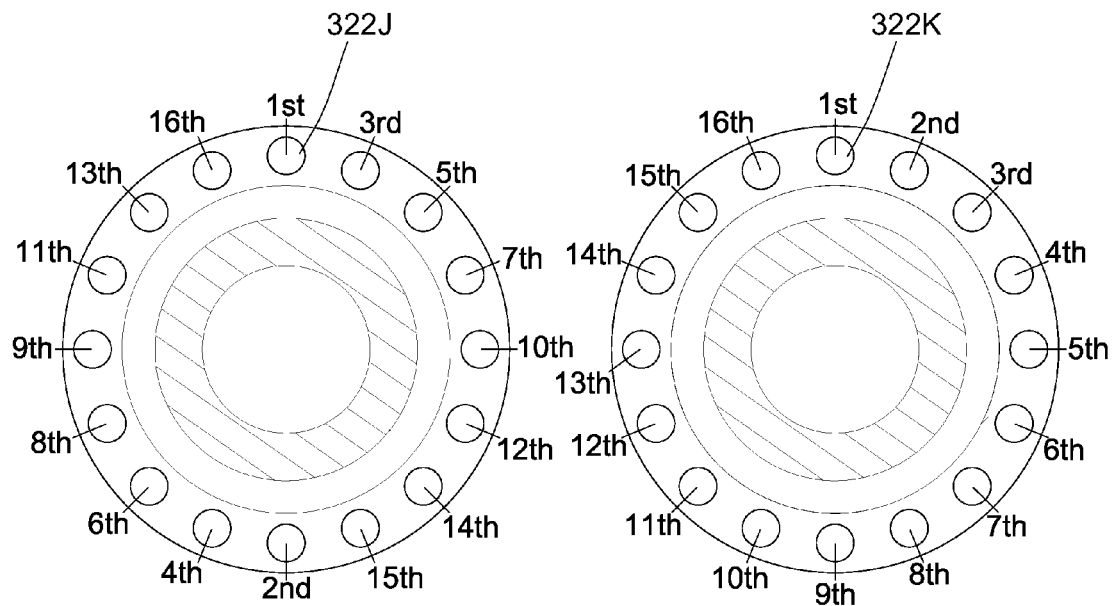
FIG. 8a is a cross-sectional diagram of a downhole tool string component.
FIG. 8b is a cross-sectional diagram of a downhole tool string component.
Figures 8C, 8D:
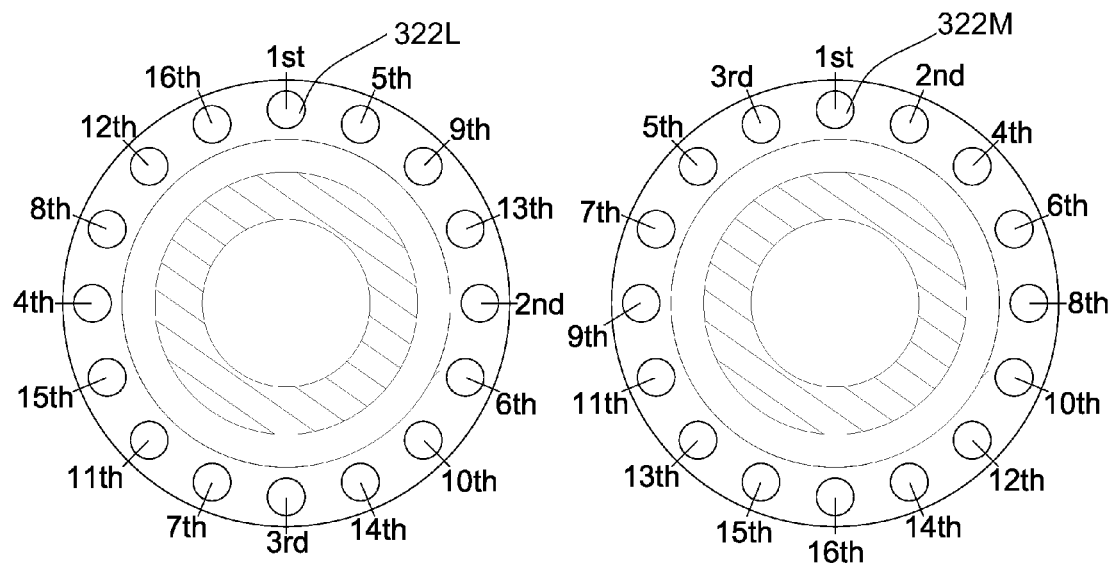
FIG. 8c is a cross-sectional diagram of a downhole tool string component.
FIG. 8d is a cross-sectional diagram of a downhole tool string component.

The stab connection 300B may connect with another component through a dock 510 (See FIG. 5). The stab connection 300B may include a plurality of wires 301B extending from a first end 302B of the cage 200B. The stab connection 300B may also include a bulkhead connector, boot connector, feed through connector, other electrical connectors known in the art, or combinations thereof. The plurality of wires 301B may comprise wires extending individually or sets of wires wrapped together. One wire within the plurality of wires 301B may be wired to a separate downhole drill string instrument 322B. The separate downhole drill string instrument 322B may be individually excitable.

The stab connection 300B may electrically connect to a multiplexor 626. The multiplexor 626 may have more inputs than outputs. The downhole drill string instrument 322B may include an induction receiver, induction transmitter, Halbach array, battery, acoustic tool, and/or nuclear tool. Each instrument 322B may be independently excitable. Independently excitable instruments 322B may focus an induction field (as in a resistivity tool) or signal (as in a nuclear or sonic tool for example) into only a portion of the formation adjacent to the excitable instruments while the remaining portion of the formation is minimally affected or not affected at all. Furthermore, the ability to concentrate the field in portions of the formation adjacent the bore hole allows for directional measurements of the formation.

The cage 200B may also include a shell 320B circumferentially disposed exterior an inner cylinder 1010B and along at least a portion of the length of the cage 200B. The shell 320B may have a plurality of recesses 321B adapted to house the plurality of instruments 322B. Each recess within the plurality of recesses 321B may have at least one wire from the plurality of wires 301B connectable to the instrument 322 in that recess.

The shell 320B may be segmented. The shell 320B may be mounted onto the inner cylinder 1010B through a joining mechanism which may comprise bolts, nuts, latches, screws, clips, hinges, adhesives, metallic bonding agents, welds, pins, other joining elements known in the art or combinations thereof. The shell 320B may also be spring loaded to snap onto the inner cylinder 1010B. Segmenting the shell 320B may lead to easy removal from and assembly onto the inner cylinder 1010B.

Figure 3B:
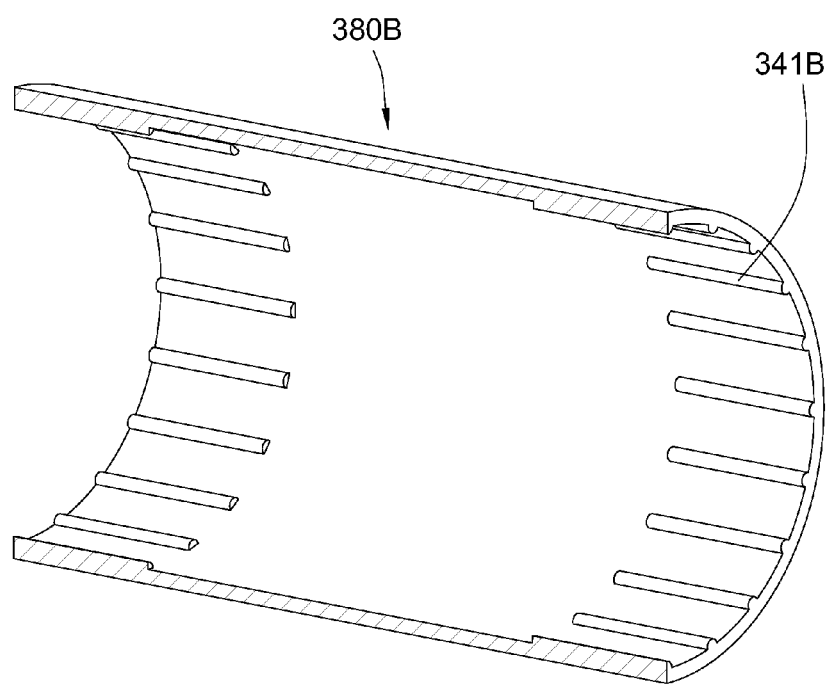
FIG. 3b is a cross-sectional diagram of an embodiment of an outer cover.

FIG. 3b is a cross-sectional diagram of an embodiment of an outer cover 380B. The cage 200B may comprise a plurality of grooves 340B (as shown in FIG. 3a) disposed circumferentially around the cage 200B and sized to accept a plurality of rods 341B in each groove within the plurality of grooves 340B. The plurality of grooves 340B and plurality of rods 341B may limit the rotation of the cage 200B with respect to the downhole drill string by restricting the rotation of the cage 200B with respect to the outer cover 380B. The plurality of grooves 340B and plurality of rods 341B may also bear a majority of the load exerted on the drill string while downhole.

Figure 4:
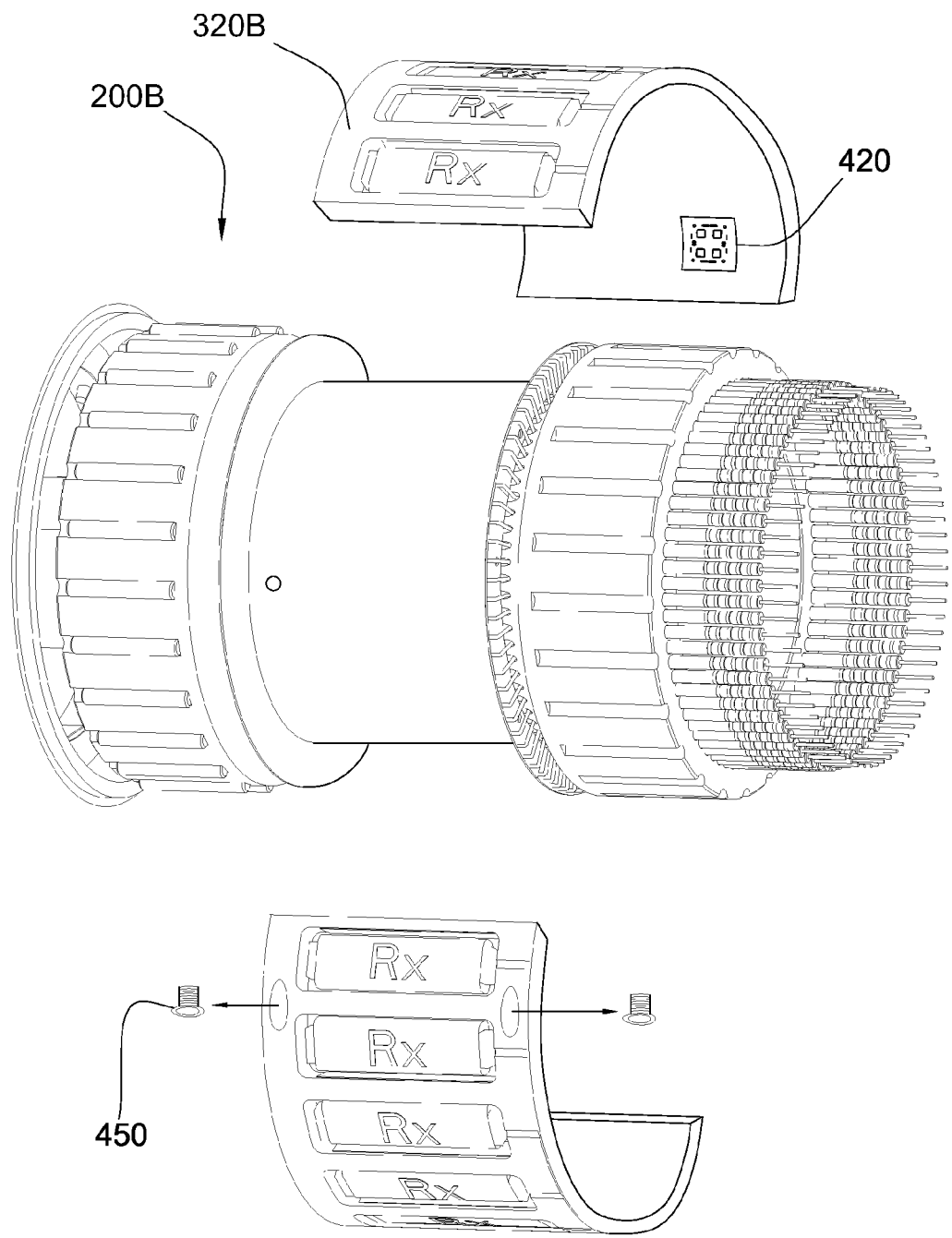
FIG. 4 is an exploded view of an embodiment of a cage.

FIG. 4 is an exploded view of the cage 200B of FIG. 3a. The shell 320B may be mounted to the cage 200B through screws 450 as shown. The cage 200B may include a processing unit 420. The processing unit 420 may allow for independent operation of the plurality of instruments 322B.

In various embodiments, two or more cages 200B of varying purpose (i.e. nuclear, resistivity, power, etc.) and having processor units 420 may be stacked within a drill string. A signal sent downhole by a downhole network or similar means may call for the operation of a particular cage 200B and may be picked up by the processor unit 420 of that particular cage 200B. Stacking the cages 200B may not affect the addressability of each cage 200B, no matter the quantity or arrangement of cages 200B. Downhole programming may be unnecessary if each cage 200B has its own uniquely identifiable processor unit 420 and thus may be placed on the drill string in any order and called on by surface equipment to perform various functions.

FIG. 5 displays a perspective view of an inner cylinder 1010C. In some embodiments, downhole drill string instruments 322C may be mounted directly on inner cylinder 1010C. The inner cylinder 1010C may include a stab connection 300C adapted to electrically connect the downhole drill string instruments 322C on the inner cylinder 1010C to another portion of the downhole drill string or to another cage for example. The stab connection 300C may be received by a dock 510 within the downhole drill string. The dock 510 may have at least one port 511 disposed on a second end 303B of a cage 200C and positioned to accept an alignment key 700 (See FIG. 7) disposed within a first end of another cage.

FIGS. 6a-d show several embodiments of a cage comprising various downhole instruments. FIG. 6a displays an embodiment of a cage 200D comprising induction receivers 211D arranged circumferentially along an outer diameter of a shell 320D. The induction receivers 211D may be used to read a signal induced in a formation by an induction transmitter (not illustrated). FIG. 6b shows an embodiment of a cage 200E comprising a plurality of induction transmitters 212E mounted circumferentially along the outer diameter of a shell 320E. The plurality of induction transmitters 212E may induce a magnetic field in a formation which may be read by induction receivers on another shell on the drill string. FIG. 6c shows an embodiment of a cage 200F comprising a plurality of batteries 213F. The plurality of batteries 213F may power a downhole component such as a receiver, transmitter, nuclear tool, sonic tool, motor or combinations thereof. A stab connection 300F may communicate power from the plurality of batteries 213F to the downhole component. FIG. 6d shows an embodiment of a cage 200G comprising a plurality of nuclear tool components 214G. The nuclear tool components 214G may be used to gather characteristic data of a formation. In other embodiments, a cage may comprise sonic sensors, geophones, hydrophones, accelerometers, inclinometers, pressure transducers, magnetometers, gyroscopes, temperature sensors, gamma ray sensors, neutron sensors, seismic sensors, mud logging devices, resistivity sensors, induction sensors, nuclear sensors, imaging devices, GPS devices, Hall-effect sensors, permeability sensors, porosity sensors, vibration sensors, electrical potential sensors, a CPU or combinations thereof.

FIG. 7 is a perspective diagram of an embodiment of a cage 200H. The first end 302H may comprise an alignment key 700. The alignment key 700 may comprise a tapHered geometry and/or comprise a round, square, or oval cross section. The cage 200H may be slid over a mandrel 202H and connected to an adjacent component by aligning the alignment key 700 with ports on an adjacent component which may in turn align the stab connection 300H with a dock.

The cage 200H may also comprise a seal 701 which may restrict the access of drilling fluid into certain areas. The seal 701 may comprise a ring, band of rubber, washer, foam or combinations thereof. Seals 701 may be mounted on the cage 200H near the first end 302H and/or second end 303H.

FIGS. 8a-d are cross-sectional views of embodiments of a cage 200J, 200K, 200L, 200M. Each cage 200J, 200K, 200L, 200M comprises individually excitable instruments 322J, 322K, 322L, 322M. In some embodiments, these instruments 322J, 322K, 322L, 322M may be excited at once, in pairs, in groups, or individually.

In some applications it may be desirable to analyze only a portion of the formation by exciting individual instruments 322J, 322K, 322L, 322M. Where accuracy is critical the drill string may be stopped while instruments 322J, 322K, 322L, 322M may be individually activated. Additionally, individual instruments 322J, 322K, 322L, 322M may be activated while the drill string rotates. The instruments 322J, 322K, 322L, 322M may be activated in a number of different orders. The activation orders may include but are not limited to the orders depicted in FIGS. 8a, 8b, 8c, and 8d. The instruments 322J, 322K, 322L, 322M may be activated in a clockwise or counterclockwise direction.

Figure 9A:
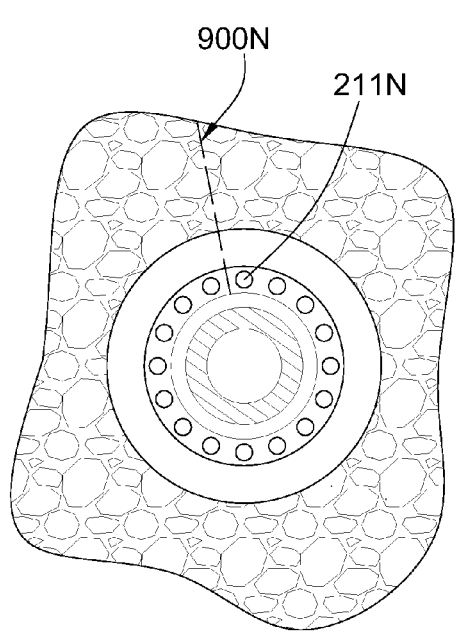
FIG. 9a is a cross-sectional diagram of a downhole tool string component.
Figure 9B:
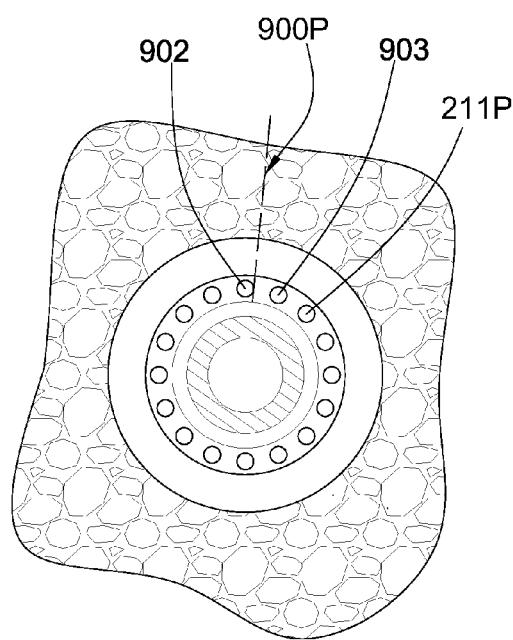
FIG. 9b is a cross-sectional diagram of a downhole tool string component.

FIGS. 9a and 9b depict different embodiments of induction receivers 211N, 211P. The induction receivers 211N, 211P may be independently excitable. The induction receivers 211N, 211P may also be tunable such that a virtual receiver 900N, 900P may be created. A virtual receiver 900N, 900P may be created when two adjacent induction receivers 211N, 211P adjust their power such that a virtual receiver 900N, 900P can be modeled as being positioned between the two induction receivers 211N, 211P. FIG. 9a depicts an embodiment of a virtual receiver 900N that is the result of the data received by two adjacent induction receivers 211N being equally weighted. FIG. 9b depicts an embodiment of a virtual receiver 900P that is the result of the data received by an induction receiver 902 being weighed more heavily than the data received by an adjacent induction receiver 903. The virtual receiver 900P in this case appears closer to induction receiver 902 than induction receiver 903.

Whereas the present invention has been described in particular relation to the drawings attached hereto, it should be understood that other and further modifications apart from those shown or suggested herein, may be made within the scope and spirit of the present invention.

What is claimed is:

1. A cage for fitment on a downhole tool component mandrel, the cage comprising:
   a cylindrical body having a bore sized and shaped to fit about said downhole tool component mandrel, an inner surface defining said bore, an outer surface spaced apart from said bore, and a first end
   a stab connection originating at said first end and said stab connection having a plurality of circumferentially arranged electrical connectors extending away from said first end in an axial direction; and
   a plurality of independently excitable downhole drill string instruments circumferentially disposed about said outer surface.

2. The cage of claim 1, wherein at least one of the plurality of downhole drill string instruments is an induction receiver.

3. The cage of claim 1, wherein at least one of the plurality of downhole drill string instruments is an induction transmitter.

4. The cage of claim 3, wherein the induction transmitter is a Halbach array.

5. The cage of claim 1, wherein at least one of the plurality of downhole drill string instruments is a battery.

6. The cage of claim 1, wherein at least one of the plurality of downhole drill string instruments is a nuclear tool.

7. The cage of claim 1, wherein at least one of the plurality of downhole drill string instruments is an acoustic tool.

8. The cage of claim 1, wherein the cage has a second end spaced apart from said first end, said second end having a dock sized and shaped to receive said stab connection.

9. The cage of claim 1, wherein the cage includes a shell disposed between said outer surface and said plurality of independently excitable downhole drill string instruments, said shell extending axially along said outer surface.

10. The cage of claim 9, wherein the shell has at least one recess sized and shaped to receive at least one downhole drill string instrument.

11. The cage of claim 9, wherein the cage includes a seal disposed on the cylindrical cage.

12. The cage of claim 9, wherein the shell is formed of a plurality of segments.

13. The cage of claim 12, wherein at least two segments are joined through a joining mechanism disposed at least partially on each segment.

14. The cage of claim 1, wherein the cage has an alignment key disposed on the first end.

15. The cage of claim 1, further comprising a multiplexer, wherein the stab connection electrically communicates with said multiplexor.

16. The cage of claim 1, wherein the cage includes a plurality of longitudinal grooves disposed circumferentially around the cage.

17. The cage of claim 16, wherein the cage further comprises an outer cover having a plurality of rods with a first geometry complementary to a second geometry of the plurality of grooves.

18. The cage of claim 1, further comprising a uniquely identifiable processor unit.

19. The cage of claim 1, wherein the cage further comprises a processing unit.

20. A downhole drill string component, comprising:
   a mandrel having a mandrel outer surface;
   a first substantially cylindrical cage having:
      a first body having a first bore sized and shaped to fit about said mandrel outer surface, a first inner surface defining said first bore, a first outer surface spaced apart from said first bore, and a first end;
      a first stab connection originating at said first end and said first stab connection having a first plurality of circumferentially arranged electrical connectors extending away from said first end; and
      a first plurality of independently excitable downhole drill string instruments circumferentially disposed about said first outer surface;
   an alignment key disposed at said first end; and
   a second substantially cylindrical cage having:
      a second body having a second bore sized and shaped to fit about said mandrel outer surface, a second inner surface defining said second bore, a second outer surface spaced apart from said second bore, and a second end;
      a dock connection positioned at said second end, said dock connection sized and shaped to receive said first plurality of circumferentially arranged electrical connectors; and
   a port sized and shaped to receive said alignment key.

* * * * *